No. 768,905. PATENTED AUG. 30, 1904.
W. F. McNAMIRE & M. A. YOCUM.
POTATO DIGGER.
APPLICATION FILED MAR. 18, 1904.
NO MODEL. 2 SHEETS—SHEET 2.
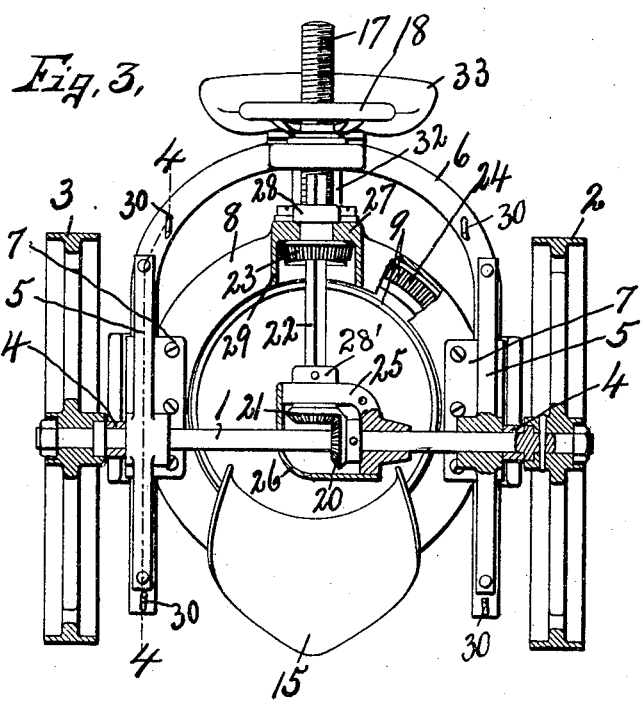
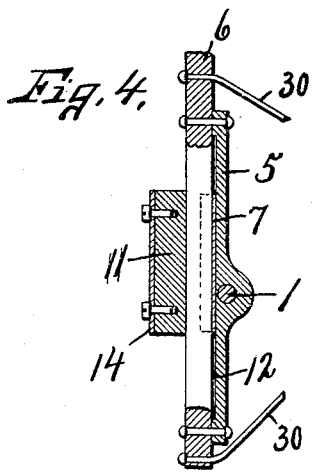
WITNESSES.
B. C. Robinson.
H. E. Chase
INVENTORS
Willard F. McNamire and
Myron A. Yocum.
BY Howard P. Denison
ATTORNEY.

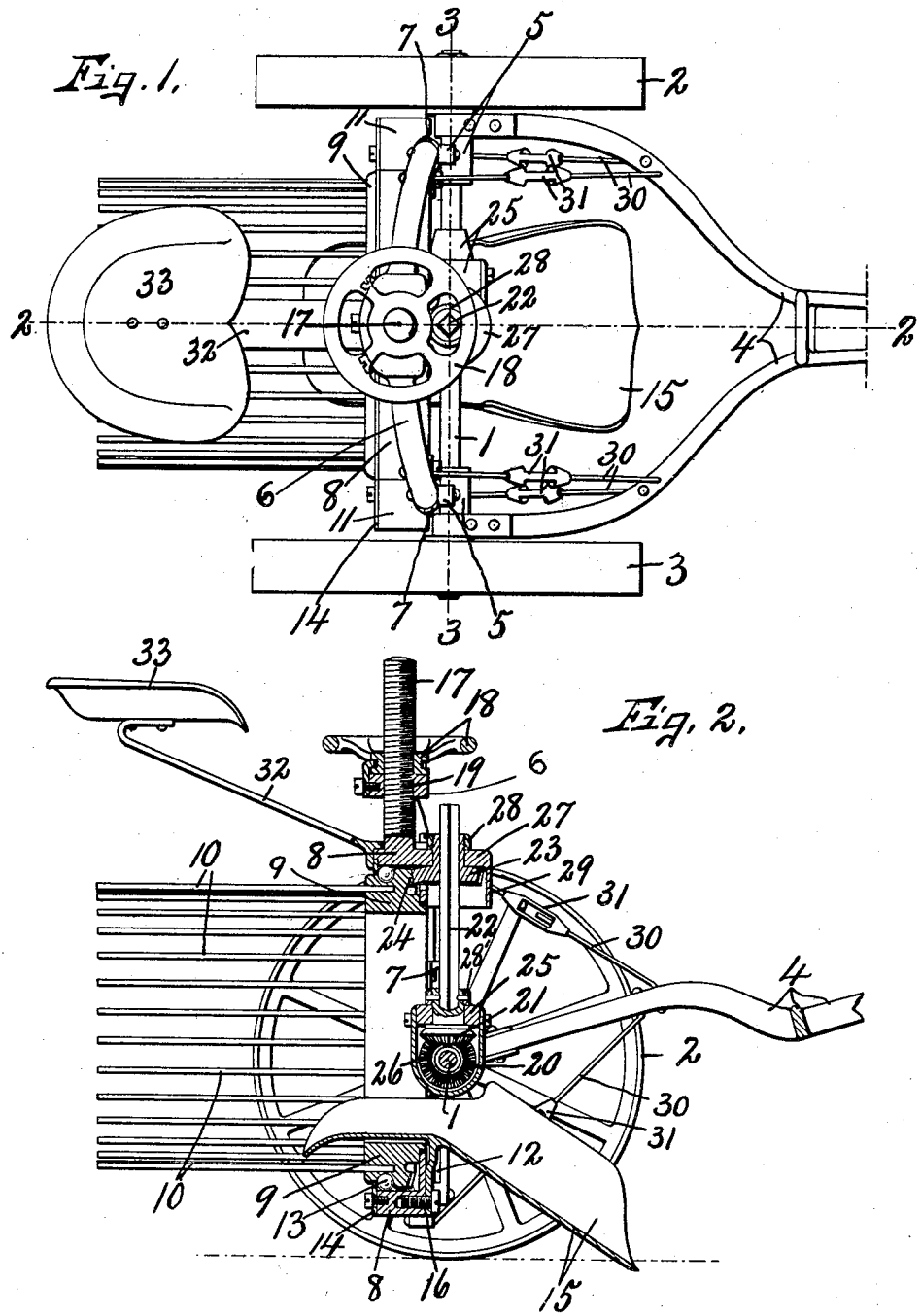

No. 768,905. Patented August 30, 1904.

UNITED STATES PATENT OFFICE.

WILLARD F. McNAMIRE AND MYRON A. YOCUM, OF MENDON, OHIO.

POTATO-DIGGER.

SPECIFICATION forming part of Letters Patent No. 768,905, dated August 30, 1904.

Application filed March 18, 1904. Serial No. 198,721. (No model.)

*To all whom it may concern:*

Be it known that we, WILLARD F. McNA-MIRE and MYRON A. YOCUM, of Mendon, in the county of Mercer, in the State of Ohio, have invented new and useful Improvements in Potato-Diggers, of which the following, taken in connection with the accompanying drawings, is a full, clear, and exact description.

This invention relates to improvements in sulky potato-diggers in which the potatoes and earth are elevated by a suitable plow or scoop and thrown into a rotary separator, whereby the potatoes are separated from the refuse and finally discharged at the rear of the machine.

The primary object of our present invention is to mount the plow or scoop and also the rotary separator upon a vertically-adjustable frame which is guided in vertical ways supported upon the axle at the sides of the rotary frame; and another object is to provide a central vertical guide for the frame and a central adjusting-screw directly in front and within easy reaching distance of the seat, so that the vertically-adjustable frame may be moved to any desired position by means of the screw.

Other more specific objects will appear in the following description.

In the drawings, Figure 1 is a top plan of a sulky potato-digger embodying the various features of our invention. Figs. 2, 3, and 4 are sectional views taken, respectively, on lines 2 2, 3 3, Fig. 1, and 4 4, Fig. 3.

Similar reference characters indicate corresponding parts in all the views.

In carrying out the objects stated we provide a rotary shaft 1 with sulky-wheels 2 and 3, one of which, as 2, is tight on the shaft and serves as a traction-wheel for rotating the shaft as the potato-digger is drawn over the surface of the ground, while the other wheel, 3, is preferably loose on the shaft.

The device may be drawn over the surface of the ground by manual or horse power, and we have therefore shown a pole 4, having a bifurcated rear end, the arms of which are attached to the axle in close proximity to the wheels, thus leaving a clear open space between the arms, so that the driver may readily see and properly guide the nose of the plow along the potato-hills. Mounted upon the opposite ends of the axle 1 at opposite sides of its longitudinal center is a pair of vertical ways 5, extending substantially equal distances above and beneath the axle, and to these ways are secured the opposite ends of a U-shape or arched yoke 6. The ways 5 are loosely mounted upon the shaft 1 just inside of the arms of the pole 4, and it is therefore evident that the axle or shaft 1 is journaled in the arms of the pole and also in the upright ways 5. The opposite arms of the U-shaped yoke 6 extend downwardly at the rear of and parallel with the ways 5 and are therefore located at the rear of the axle; but we preferably leave an open space or slot between the arms of the yoke 6 and adjacent rear face of the ways 5 to receive suitable guide-bearings 7 of a vertically-movable frame, which in this instance consists of an annular ring 8. This annular ring or vertically-movable frame is disposed in an upright position substantially midway between the wheels and having its axis parallel with the line of draft, so as to receive and support a second annular ring 9, having rearwardly-projecting fingers 10, which together with the ring 9 constitute a rotary separator.

The vertically-movable frame or ring 8 is provided with laterally-projecting lugs 11, which ride upon the rear faces of the opposite arms of the yoke 6, while the plates 7 are secured to the front face of the ring 8 and project between the ways 5 and adjacent arms of the yoke, the slots or spaces between the parts 5 and adjacent arms of the yoke 6 being designated by the reference-numeral 12, and these slots are of greater length or height than the height of the plates 7, and therefore the rim or frame 8 is free to move vertically a limited distance for the purpose of adjusting the plow relative to the ground, as presently described. The inner face of the ring 8 forms an annular bearing for the rotary ring 9, and we usually interpose suitable anti-friction-bearings, as balls 13, between the rings 8 and 9. The ring 9 is inserted into the ring 8 from the rear end and is held in place by a retainer or annulus 14, which is secured to the rear face of the ring 8.

A plow 15 is secured to the front face of the ring 8 by a suitable fastening means, as screws 16, the forward end of the said plow being inclined downwardly and forwardly in front of the axle 1, while the rear end extends rearwardly beyond said axle and through the ring 9, so as to discharge the potatoes and refuse into the separator.

It now appears that the separator and plow are both mounted upon the vertically-adjustable frame 8 and are therefore adjustable vertically simultaneously to vary the digging depth of the plow. This vertical adjustment is effected by means of a screw 17 and nut 18, the screw 17 rising centrally from and forming a part of the upper portion of the frame 8 and passes through a suitable aperture 19 in the center of the arch of the yoke 6, while the nut 18 preferably consists of a hand-wheel rotatably mounted upon the center of the yoke 6 and is engaged with the screw 17, so that by rotating the hand-wheel or nut the frame 8 and the parts carried thereby are moved vertically to the desired position. The yoke 6 and the rings 8 and 9 are disposed in substantially the same transverse plane, the ring 8 being located within and guided upon the depending arms of the yoke and the ways 5, while the rotary ring 9 is located within the ring 8 and is therefore adjusted vertically with said ring 8. Rotary motion is transmitted to the separator through the medium of intermeshing gears 20 and 21, an upright shaft 22, and additional intermeshing gears 23 and 24. The gear 20 is secured to the shaft 1 and meshes with the gear 21, which is secured to the lower end of the spindle 22, the adjacent portions of the shafts 1 and 22 being yoked together by a suitable bracket 25, and the gears are inclosed by a casing 26 to prevent the accumulation of dust or foreign substance on said gears. The upright spindle 22 extends upwardly from the center of the shaft 1, and its axis intersects the axis of the shaft 1 and also the axis of the rotary separator. The central upper portion of the ring 8 is provided with a forward extension 27, in which the gear 23 is journaled, and the upper end of the spindle 22 is preferably angular in cross-section and passes through a similar aperture in the gear 23, the latter being held in place by a suitable locknut 28, engaged with the upper face of the extension 27, while the gear 23 is disposed at the lower side of the extension 27 and is protected from the elements by a shield 29.

The gear 21 is journaled in the bracket 25 and is held in a position by the shoulder 28', which engages the upper face of the said bracket and operates to hold the shaft 22 from vertical movement, although it is free to slide in the gear 23. This latter gear 23 meshes with the gear 24, which is formed upon the front face of the ring 9 and by which rotary motion is transmitted to the separator. The spindle 22 is located in front of the separator and forms an additional guide for the movable frame 8. The lower and upper ends of the fixed frame—for instance, the lower and upper ends of the yoke 6—are connected to the pole or tongue by tie-rods 30, which form suitable braces to hold the pole or tongue in fixed relation to the yoke 6, although the angle of inclination of the pole with reference to said yoke may be varied by turnbuckles 31, which form a part of the tie-rods 30. A spring seat-support 32 is secured at its forward end centrally upon the vertically-adjustable frame 8 and extends rearwardly therefrom and receives and supports a suitable seat 33, which is so arranged as to bring the operator within easy reaching distance of the hand-wheel 18.

In the operation of my invention the plow is first adjusted to the proper digging depth by adjusting the vertically-movable frame 8 through the medium of the screw 17 and hand-wheel 18, and the whole device may be then drawn along the ground by hand or animal-power, whereupon rotary motion is transmitted from one of the traction-wheels to the separator through the medium of the gears 20 and 21, spindle 22, and gears 23 and 24, and as the potatoes are unearthed a relative amount or dirt or other refuse is also scooped up by the plow and together with the potatoes this refuse is thrown back into the rotary separator, in which the refuse is sifted between the fingers 10, while the potatoes are gradually thrown out at the rear of the separator, which extends some distance to the rear of the axle.

Having thus described our invention, what we claim, and desire to secure by Letters Patent, is—

1. In a sulky potato-digger, the combination with a rotary axle and a traction-wheel operatively connected to rotate the axle, of a fixed frame mounted on the axle, a vertically-adjustable frame guided on the fixed frame, a separator rotatingly mounted on the vertically-adjustable frame, a plow on the adjustable frame, and a threaded member centrally over the separator and operatively connected to raise and lower the vertically-adjustable frame.

2. In a sulky potato-digger, the combination with a rotary axle and a traction-wheel operatively connected to rotate the axle, of a fixed frame mounted on the axle, vertically-adjustable frame guided on the fixed frame, a separator rotatingly mounted on the vertically-adjustable frame, a plow on the adjustable frame, a threaded stud rising centrally from the vertically-adjustable frame, and a threaded hand-piece operatively connected to the fixed frame and engaging the stud to move the adjustable frame vertically.

3. In a sulky potato-digger, the combination with a rotary axle and a traction-wheel operatively connected to rotate said axle, of a fixed frame carried by the axle, a vertically-movable frame guided in the fixed frame and provided with an annular bearing, a rotary separator journaled in the bearing, a plow secured to the movable frame and extending into the separator, means for transmitting rotary motion from the axle to the separator, and additional means centrally over the separator and operatively connected to adjust the movable frame vertically.

4. In a sulky potato-digger, the combination with a rotary axle and supporting-wheels one of the wheels being operatively connected to rotate the axle, guides rising from the opposite ends of the axle, a vertically-moving annular bearing supported on the guides, a rotary separator journaled on said bearing, a plow movable with the bearing and projecting into the separator, and a screw and nut operatively connected to move the bearing and plow vertically.

5. In a potato-digger, the combination with an axle and a traction-wheel connected to rotate the axle, of a vertically-adjustable ring and guides therefor at opposite sides of the ring, a second ring rotatably mounted on the former ring and provided with a circular row of rearwardly-projecting fingers, a hand-wheel centrally over the rings and connected to raise and lower the same, a plow carried by the first-named ring and projecting rearwardly through the second ring, and means for transmitting rotary motion from the axle to the second ring.

6. In a potato-digger, the combination with a rotary separator and a vertically-adjustable support therefor, of an axle and a traction-wheel rotating the same, and a rotary upright shaft connected to transmit rotary motion from the axle to the separator.

7. In a potato-digger, the combination with a rotary separator and a vertically-adjustable support therefor, of an axle and a traction-wheel rotating the same, and a rotary upright shaft connected to transmit rotary motion from the axle to the separator said shaft having sliding connection with the adjustable support.

8. In a potato-digger, the combination with a rotary axle and a traction-wheel connected to rotate the axle, of a pole connected to the axle, a yoke at the rear of the axle and projecting above and beneath the same, tie-rods connecting the pole to the yoke at points above and beneath the axle, a vertically-adjustable frame guided on the yoke and provided with a threaded stud extending upwardly through the yoke, a nut engaged with the stud and yoke to adjust the frame, a separator rotatingly mounted in the frame, and a plow secured to the frame and projecting rearwardly into the separator.

In witness whereof we have hereunto set our hands this 8th day of March, 1904.

WILLARD F. McNAMIRE.
MYRON A. YOCUM.

Witnesses:
  HENRY CAIL,
  J. B. MAURER.